United States Patent [19]

Waters

[11] E Patent Number: Re. 33,286

[45] Reissued Date of Patent: Aug. 7, 1990

[54] PERSONAL AIR CONDITIONER

[76] Inventor: William A. Waters, 3648 E. 49th St., Tulsa, Okla. 74135

[21] Appl. No.: 324,095

[22] Filed: Feb. 14, 1989

Related U.S. Patent Documents

Reissue of:

[64] Patent No.: 4,238,857
Issued: Dec. 16, 1980
Appl. No.: 944,857
Filed: Sep. 22, 1978

U.S. Applications:

[60] Division of Ser. No. 563,066, Mar. 28, 1975, Pat. No. 4,141,083, which is a continuation-in-part of Ser. No. 387,956, Aug. 13, 1974, Pat. No. 3,881,198.

[51] Int. Cl.[5] ..... A42C 5/04

[52] U.S. Cl. ..... 2/171.3; 2/185 R; 2/199; 2/438; 2/209.3; 351/158

[58] Field of Search ..... 2/171.3, 7, 438, 422, 2/436, 437, 185 R, 199, DIG. 11, 171, 209.3; 351/158

[56] References Cited

U.S. PATENT DOCUMENTS

| | | | |
|---|---|---|---|
| 263,980 | 9/1882 | Snow | 2/7 |
| 290,017 | 12/1883 | Farmer | 213/175 |
| 340,793 | 4/1886 | Leonard | 2/7 |
| 432,728 | 7/1890 | Eliel | 2/171.3 |
| 581,129 | 4/1897 | Nevius | 362/105 |
| 585,186 | 6/1897 | Cross | 2/181.6 |
| 594,209 | 11/1897 | Mears | 2/7 |
| 735,790 | 8/1903 | Meerza | 2/171.3 |
| 935,556 | 9/1909 | Smith | 2/171.4 |
| 1,493,463 | 2/1923 | Brock | 2/209.2 |
| 1,723,633 | 8/1927 | Small | 2/185 R |
| 1,737,460 | 11/1929 | Johnson | 219/528 |
| 1,745,416 | 2/1930 | Guy | 2/7 |
| 2,007,821 | 12/1934 | Uriwal | 2/173.5 |
| 2,335,630 | 1/1943 | Bachardy | 2/7 |
| 2,769,308 | 9/1954 | Krasno | 2/171.2 |
| 2,875,447 | 3/1959 | Goldmerstein | 2/171.2 |
| 2,989,049 | 5/1958 | Crouzet | 126/208 |
| 2,994,090 | 10/1957 | Ostwald | 2/182.1 |
| 3,045,450 | 7/1962 | Chandler | 2/182.1 |
| 3,070,803 | 1/1963 | Slepicka | 2/7 |
| 3,160,735 | 12/1964 | Aufricht . | |
| 3,168,748 | 6/1961 | Limberg | 2/171.3 |
| 3,238,535 | 3/1966 | Richey | 2/8 |
| 3,295,511 | 1/1967 | Crouzet | 2/205 X |
| 3,353,188 | 11/1967 | Crincic | 2/171.1 |
| 3,353,191 | 11/1967 | Dahly | 2/171.3 |
| 3,391,407 | 7/1968 | Waters | 2/171.3 |
| 3,491,374 | 1/1970 | Frangos | 2/171.3 |
| 3,735,423 | 5/1973 | Droz | 2/171.3 |
| 3,881,198 | 5/1975 | Waters | 2/171.3 |
| 4,680,815 | 7/1987 | Hirsch et al. | 2/171.3 |
| 4,744,106 | 5/1988 | Wang | 2/171.3 |

FOREIGN PATENT DOCUMENTS

| | | |
|---|---|---|
| 449456 | 6/1936 | Canada . |
| 699022 | 10/1953 | United Kingdom . |
| 413447 | 7/1954 | United Kingdom . |
| 1341395 | 12/1973 | United Kingdom . |

*Primary Examiner*—Peter Nerbun
*Attorney, Agent, or Firm*—Larson & Taylor

[57] ABSTRACT

A self-contained air conditioning unit for headwear of substantially any type comprising an electric motor and fan removably secured within a lightweight housing, said motor being secured to an air inlet screen removably securable to the headwear, a power supply holder means supporting suitable power supply means electrically connected with the motor, a switch operably connected with the power supply and motor for selective actuation of the motor and fan, and said fan being selectively operably by the motor for blowing warm or cool air onto the wearer of the headwear.

32 Claims, 3 Drawing Sheets

Fig. 4
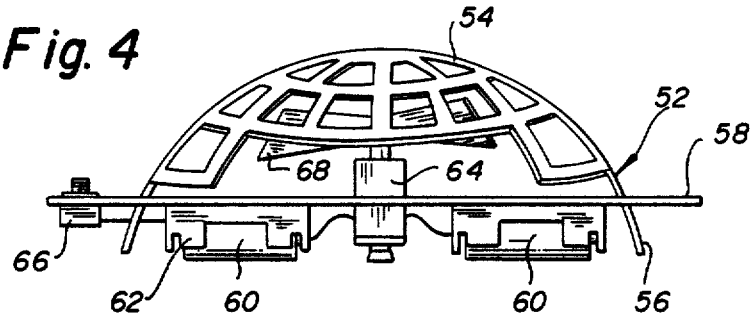
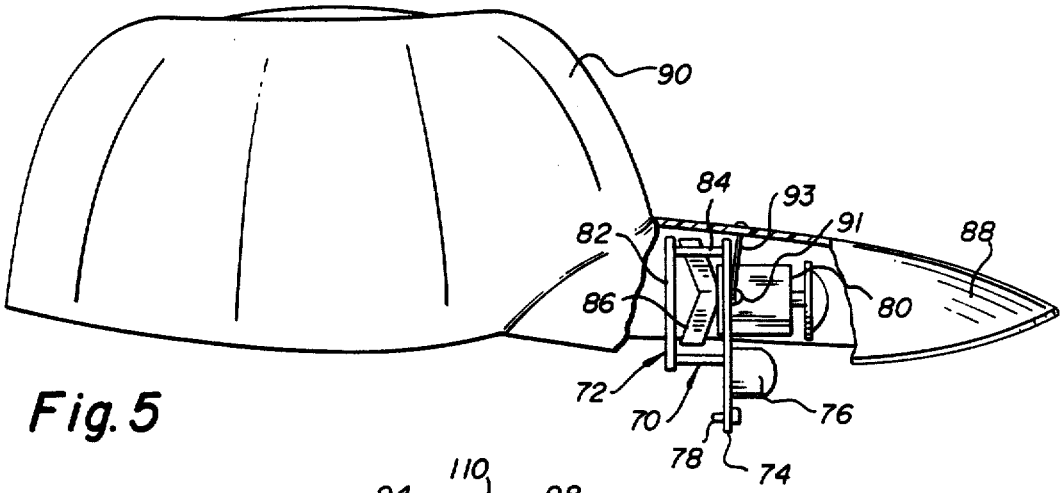
Fig. 5
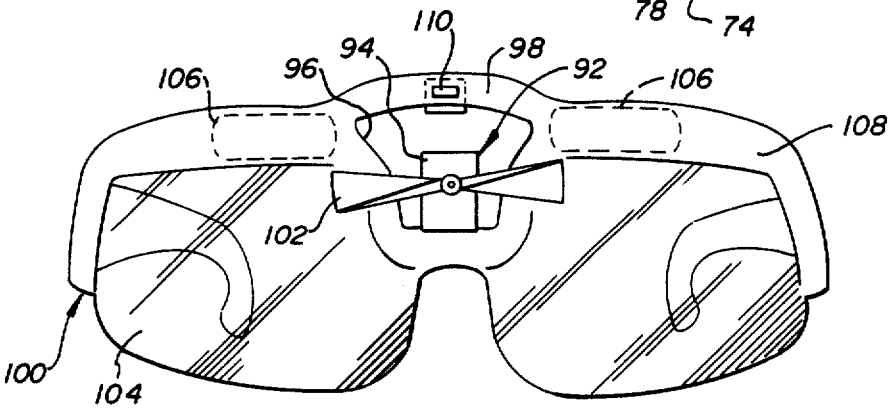
Fig. 6

Fig. 7
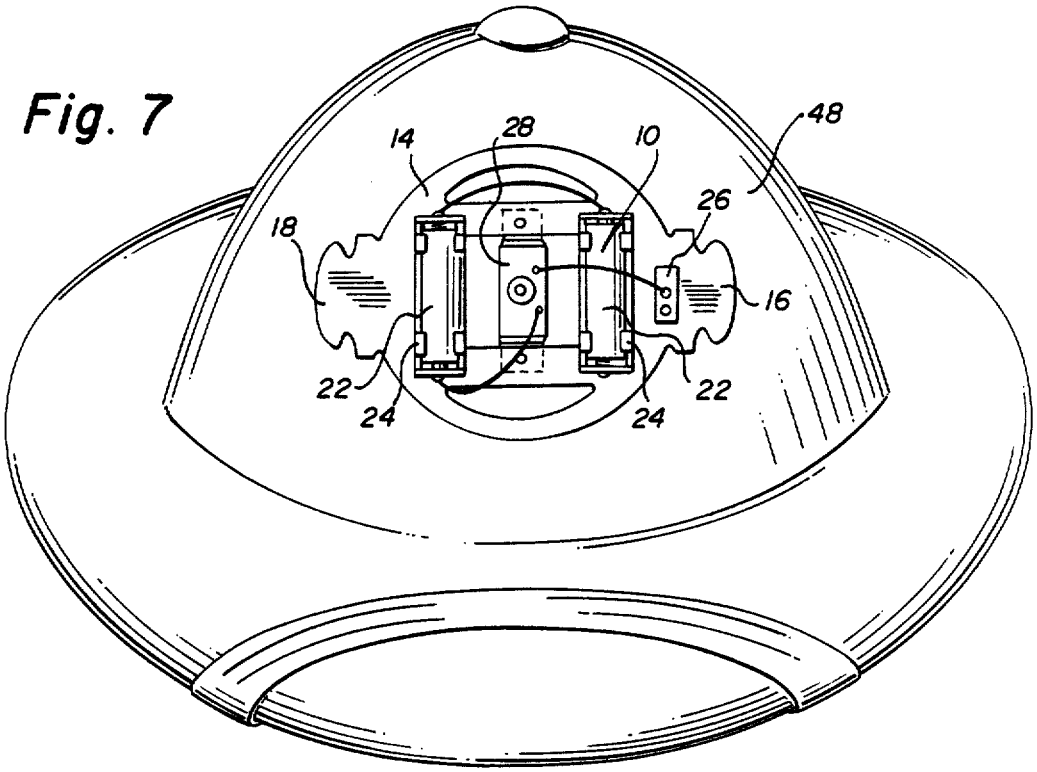
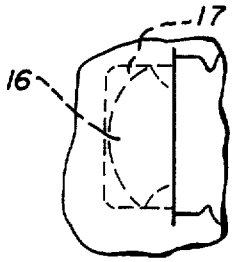
Fig. 9
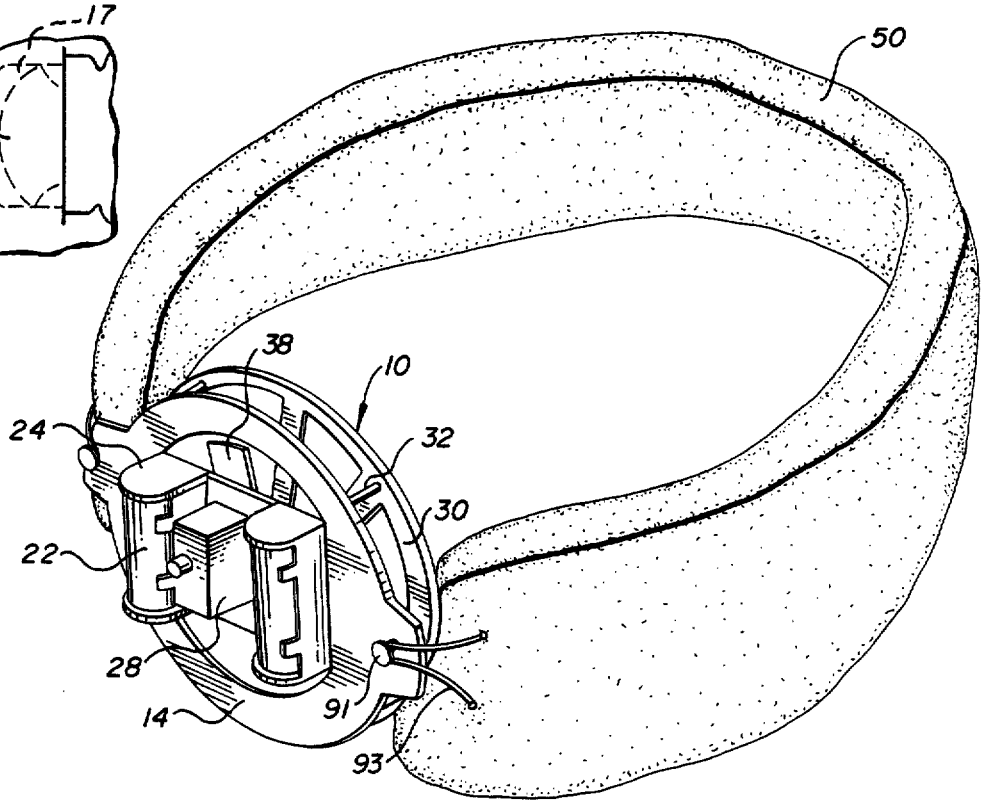
Fig. 8

PERSONAL AIR CONDITIONER

Matter enclosed in heavy brackets [ ] appears in the original patent but forms no part of this reissue specification; matter printed in italics indicates the additions made by reissue.

CROSS-REFERENCES TO RELATED APPLICATIONS

This application is a divisional application of my co-pending application Ser. No. 563,066, filed Mar. 28, 1975, now U.S. Pat. No. 4,141,083, and entitled "Personal Air Conditioning Unit" which is a continuation-in-part application of my co-pending application Ser. No. 387,956, filed Aug. 13, 1974, now U.S. Pat. No. 3,881,198 and entitled "Detachable Air Conditioning Unit for Headwear". This application is also related to Patent Disclosure Document No. 006793, filed Sept. 29, 1971; and Patent Disclosure Document No. 006878, filed Oct. 7, 1971; and Patent Disclosure Document No. 036886.

BACKGROUND OF THE INVENTION

1. Field of the Invention

This invention relates to improvements in air conditioned headwear, and more particularly, but not by way of limitation, to a removable or independent air conditioning unit for use with with substantially any headwear, such as caps, hats, headbands, eyeglasses, and the like.

2. Description of the Prior Art

Persons spending a considerable amount of time in the out-of-doors, such as workmen, athletes, sports fans, fishermen, and the like, frequently wear head gear to protect themselves from the heat or cold of the surrounding atmosphere. There is an ever increasing demand today for providing the comfort of cooling of the wearer of the head gear during hot weather conditions, or the like, or heating of the wearer during cold weather conditions. Many air conditioned hats, helmets, or the like, have been provided for achieving these end results, such as those shown in the Julius Droz U.S. Pat. No. 3,735,423, issued May 29, 1973, and entitled "Hat With Ventilating Means", or my own prior U.S. Pat. Nos. 3,391,407, issued July 9, 1968, and entitled "Helmet", and 3,548,415, issued Dec. 22, 1970, and entitled "Air Conditioned Helmet". These devices have certain disadvantages, however, in that the headwear is provided with permanently installed air conditioning units, and in the event there is no need or desire for using the air conditioning unit, the headwear may be burdensome to wear. Other types of these devices require that the headwear be altered in order to accommodate the air conditioning unit.

SUMMARY OF THE INVENTION

The present invention contemplates an independent or detachable air conditioning unit particularly designed and constructed for overcoming the foregoing disadvantages, and which may be utilized with substantially all types of headwear, such as hats, caps, helmets, headbands, eyeglasses, and the like. The novel air conditioning unit comprises an electric motor having an impeller or fan carried thereby, and removably disposed within a lightweight housing. The motor is preferably secured to an air inlet screen which may be removably secured to or within the headwear. A battery holder for receiving or supporting battery means is provided for the unit and the battery is electrically connected with the motor and an electric switch, which is also provided on the unit, and operable to selectively actuate the motor and fan.

The air conditioning unit may be secured to or in substantially any type of headwear in substantially any desired manner. For example, outwardly extending tab means may be provided on the air conditioning unit for insertion within recess means provided on the head wear for removably securing the unit to the head wear. Alternately, gripper means may be provided on the unit and the headwear for removably securing the unit to the headwear, or Velcro tape may be provided for securing the unit to the headwear, or substantially any other type securing means may be provided. Thus, the air conditioning unit may be quickly and easily installed on or in the headwear when desired, and quickly and easily removed therefrom when the headwear is to be otherwise used. The novel air conditioning unit is of an overall lightweight construction, preferably weighing not more than approximately three ounces, and is simple and efficient in operation and economical and durable in construction.

BRIEF DESCRIPTION OF THE DRAWINGS

FIG. 4 is a side elevational view of a modified air conditioning unit embodying the invention.

FIG. 5 is a side elevational view of a cap with a portion thereof cut-away for illustrating an air conditioning unit embodying the invention as installed thereon.

FIG. 6 is a front elevational view of a pair of eyeglasses having an air conditioning unit embodying the invention installed thereon.

FIG. 7 is a schematic view of a helmet and illustrates an air conditioning unit of the invention installed therein.

FIG. 8 is a perspective view of a headband having an air conditioning unit embodying the invention installed thereon.

FIG. 9 is a cutaway view of a portion of a headwear and air conditioning unit illustrating a pocket on the headwear having the air conditioning unit secured thereto.

DESCRIPTION OF THE PREFERRED EMBODIMENTS

Figure 1:
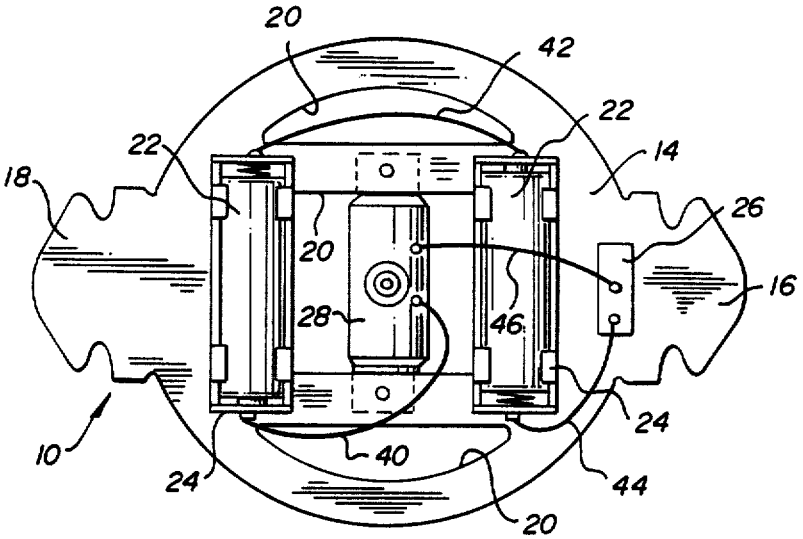
FIG. 1 is a bottom view of an air conditioning unit embodying the invention.
Figure 2:
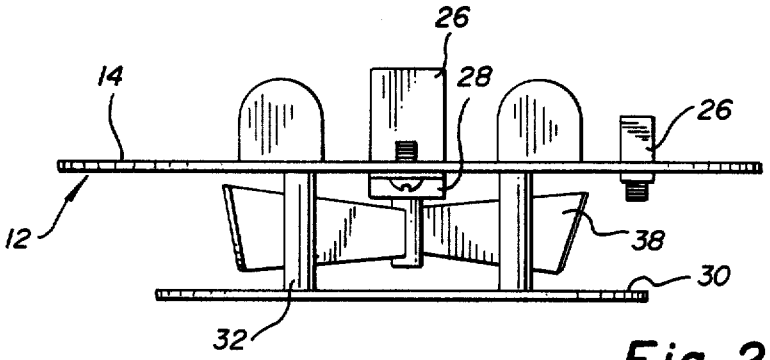
FIG. 2 is a side elevational view of an air conditioning unit embodying the invention.
Figure 3:
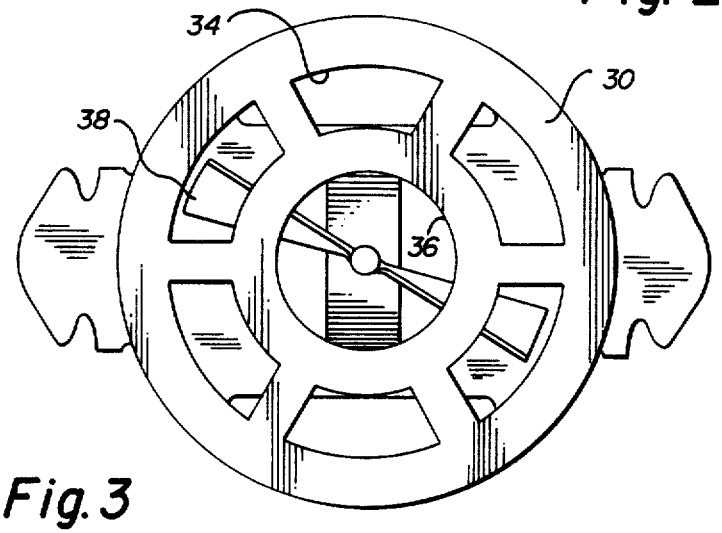
FIG. 3 is a top view of an air conditioning unit embodying the invention.

Referring to the drawings in detail, and particularly to FIGS. 1, 2 and 3, reference character 10 generally indicates an air conditioning unit for headwear comprising a housing 12 preferably constructed from a lightweight plastic material, but not limited thereto. As shows in FIGS. 1, 2 and 3, the housing 12 comprises a first substantially flat plate member 14 of a substantially circular configuration, but not limited thereto, and having a pair of oppositely disposed radially outwardly extending flaps or ears 16 and 18 preferably integral therewith. The central portion of the plate 14 is provided with a plurality of openings or apertures 20 whereby air may pass through the plate for a purpose as will be hereinafter set forth. In addition, a plurality of suitable batteries 22, preferably two, but at least one or more, are removably disposed in individual battery holders or brackets 24 mounted on or integral with the outwardly directed face of the plate 14 in any well known manner (not shown). A suitable switch member 26 is also mounted on the outwardly directed face of the plate 14 in any suitable manner and is electrically connected between the batteries 22 and a motor 28 for selective actuation of the motor.

A second substantially flat plate 30 is spaced from the plate 14 by a plurality of spaced support members 32, and the plate 30 is preferably provided with a plurality of openings 34 including a central opening 36 as particularly shown in FIG. 3. Thus, the plate 30 is of a substantially grid-type configuration whereby a stream of air may flow therethrough. The plate 30 may be constructed from a suitable lightweight plastic material, or may be constructed from a suitable mesh-like material, such as a screen (not shown), and functions as a grid for dispersing a flow of air therethrough. The plate 30 may be a temperature grid, if desired, for either warming or cooling the air passing therethrough, depending upon the desired end result for the use of the unit 10. Or alternately, a separate temperature grid (not shown) may be secured to one face of the plate 30 in any well known manner, to provide a flameless warming screen for heating the air passing therethrough, or may be a refrigerant gel screen as set forth in my aforementioned pending application for cooling the air passing therethrough.

The motor 28 extends inwardly from the plate 14 and may be of any suitable type, such as a 1.5 volt motor, and carries a fan or rotor 38 which is disposed between the screens or plates 14 and 30. The motor 28 and fan 38 are of a light-weight construction, and preferably weigh, in combination, less than one ounce. In addition, it is preferably that the fan 30 comprise blades made from a soft plastic material whereby the rotation of the blades may be stopped easily and harmlessly with a finger of the user of the unit 10. The fan 26 is rotated by the motor 28 in the usual manner and pulls air into the housing 12 through the first plate 14 and discharges air from the housing 12 through the screen or plate 30. Of course, the fan 38 is only activated when the switch 26 has been properly manipulated, as is well known.

As hereinbefore set forth, the battery or batteries 22 may be of any suitable type as required for supplying power to the motor 28, such as 1.5 volt dry cell batteries, but not limited thereto. The switch 26 may be of any suitable type, such as a toggle switch, push button type, or the like, for ready manipulation by the user of the unit 10 in order to selectively start and stop the operation thereof. The bracket or brackets 24 are preferably provided with the usual electrical contacts (not shown) for engagement with the opposite ends of the batteries 22, as is well known. One of said electrical contacts is electrically connected with the motor 28 by a lead 40 (FIG. 1) and the opposite electrical contact of the same bracket 24 is electrically connected with one contact of the other bracket 24 by a lead 42. The remaining contact is electrically connected with the switch 26 by a lead 44, and the switch 26 is electrically connected with the motor 28 by a lead 46. This places the switch 26 whereby one position thereof electrically connects the battery or batteries 22 with the motor 28 for actuation thereof, and another position of the switch 26 breaks the electrical connection between the battery or batteries 22 and the motor 28. Of course, the fan 38 is rotated continuously during the activation of the motor 28 for moving air through the housing 12 for discharge thereof through the panel or plate 30.

The air conditioning unit 10 may be removably secured to substantially any type headwear in any well known manner. However, as shown in FIGS. 1, 2 and 3, the flaps or ears 16 and 18 are particularly designed and constructed for a removable engagement with suitable pockets one of which is shown at 17 in FIG. 9 or recesses which may be provided on the headwear in any well known manner. Thus, the unit 10 may be quickly and easily installed on the headwear without substantial alteration of the overall appearance thereof when it is desired to heat or cool the air directed over the users head or across his face and forehead. The unit 10 may also be quickly and easily removed from the headwear when it is not needed, and the headwear may be utilized in its normal fashion.

For example, as schematically depicted in FIG. 7, the unit 10 may be removably secured within a helmet 48 in the manner as hereinbefore set forth, and may be utilized for heating or cooling air for discharge of the air into the head (not shown) of the wearer of the helmet. By way of further example, the unit 10 as shown in FIG. 8 may be removably secured to a sweat band or independent headband 50 in such a manner that the plate 30 is disposed against the forehead, or the like, of the person using the apparatus 10. Of course, substantially any type of device for wearing on the head may be provided with the unit 10 in order to direct warm or cool air onto the head, or any portion thereof, or onto the shoulders, or the like, of the person using the device 10.

Referring to FIG. 4, another embodiment of the invention is generally indicated at 52 and comprises a substantially semi-spherical housing 54 constructed from a suitable lightweight plastic material, or the like, and having a grid-type or open construction as clearly shown in the drawings. The open end 56 of the housing 54 is substantially closed by a plate or disc member 58 which may be generally similar to the plate 14, but not limited thereto. In this embodiment, the unit is provided with at least one, and preferably two, but not limited thereto, batteries 60 removably disposed in individual battery holders or brackets 62 which are secured to or integral with the outer face of the plate 58 in any well known manner. A motor 64 generally similar to the motor 28 is secured to the central portion of the plate 58 in any well known manner, and a switch 66 is also secured to the plate 58 in the same general manner as the switch 26. The switch 66 is electrically connected between the battery or batteries 60 and the motor 64 as hereinbefore set forth in order to provide selective actuation of the motor 64. In addition, a fan or rotor 68 similar to the fan 38 is carried by the motor 64 and rotates continuously when the switch 66 is in the "on" position, as is well known.

It will be readily apparent that the unit 52 may be quickly and easily installed in substantially any type of gear worn on the head, as hereinbefore set forth, and quickly and easily removed therefrom when the unit 52 is not required.

Referring now to FIG. 5, still another embodiment of the invention is generally indicated at 70, and as shown herein comprises a housing 72 which includes a first substantially elongated plate member 74 of a lightweight construction and of a grid-type configuration. Power means, such as a battery 76, is suitably secured to the outwardly directed face of the plate 74, and is electrically connected between a switch 78 and motor 80 which are also mounted on the plate 74. Of course, the electrical connection between the switch 78, motor 80 and battery 76 may be of any suitable or well known type whereby the motor 80 is activated only when the switch 78 is in the "on" position.

A second plate 82 is spaced from the first plate 74 by a plurality of spaced support members 84, and is preferably of an elongated grid-type configuration. As hereinbefore set forth, the plate 82 may be a temperature grid, if desired, or an independently temperature grid (not shown) may be disposed adjacent or secured to the plate 82 for warming or cooling any air passing through the plate 82. A fan 86 is carried by the motor 80 and is generally similar to the fan 38 for pulling air through the plate 74 and discharging air through the plate 82, as hereinbefore set forth.

As particularly shown in FIG. 5, the unit 70 may be removably installed in the bill 88 of a cap 90 in any suitable manner, such as a projection or knob member 91 secured to the unit 70 and removably engagable with an elastic band 93 or the like secured to the bill 88, without any substantial alteration of overall configuration of the cap. Thus, the cap 90 may be easily worn in its natural condition when the unit 70 is not required.

Referring now to FIG. 6, still another embodiment of the invention is shown wherein an air conditioning unit generally indicated as 92 is shown. The unit 92 comprises a small motor 94 of the same general type as the motor 28 removably secured in an opening 96 provided in the bridge portion 98 of a pair of eyeglasses 100. A fan 102 is carried by the motor 94, and as shown in FIG. 6 is disposed exteriorly of the eyeglass portion 104 of the eyeglasses 100. Thus, the fan will pull fresh air onto the forehead or face of person wearing the glasses 100 having the unit 92 removably installed thereon. It will be readily apparent that the fan 102 may be disposed interiorly of the eyeglass portion 104, if desired, and a suitable guard plate, or the like, (not shown) may be provided between the fan 102 and the anatomy of the person wearing the glasses 100. In addition, at least one and preferably two batteries 106 (shown in broken lines) are removably secured to the frame portion 108 of the glasses 100, and a switch 110 is also removably secured to the frame 108 in any suitable manner (not shown). Of course, the switch 110 is electrically connected between the battery or batteries 106 and the motor 94 whereby the fan 102 may be selectively rotated by manipulation of the switch 110.

It will be apparent that the entire unit 92, including the motor 94, fan 102, and battery means 106, may be removably attached to substantially any normal or standard type eyeglasses. The means for removably securing the unit 92 to the eyeglasses may be of any suitable type such as clasps, clips, snaps, or the like (not shown).

It is to be understood that substantially any well known or desirable means may be provided for removably securing the unit 10, or other air conditioning units of the invention, to the headwear, or gear worn on the head or any portion thereof, such as Velcro tape, gripper means, zipper elements, or the like (not shown). In addition, headwear constructed from soft or flexible materials in the proximity of the desired mounting location for the unit 10 may be reinforced with any desired and well known material for facilitating the installation or attachment of the unit 10 to the headwear.

As hereinbefore set forth, the unit 10 may be utilized in combination with substantially any type headwear. It is to be noted, however, in each instance it is desirable to arrange the unit 10 on the headwear in such a manner that the air blowing from the detachable or removable unit moves onto the head, or any portion thereof such as the forehead, neck, shoulders, face, or the like, of the wearer. The draft of moving air is useful and advantageous not only for cooling, but also to blow away air pollutants, mosquitoes, flies, insects, and the like, even when the downwardly or otherwise flowing air is not additionally cooled or warmed by the temperature control plate 30. It has been found that the moisture frequently on the skin of the wearer in the form of perspiration aids in the cooling of the wearer as the moving air passes across the damp skin area or areas.

Whereas the invention as particularly described herein includes the use of a conventional electric motor, it is to be understood that substantially any other type of power means may be utilized in lieu thereof. For example, solar cells may be secured in the units in such a manner that the housing of the unit may become the collector surface for solar energy for use as the power for the units, or alternately, the solar cells may be secured to the headwear in such a manner that a portion of the headwear may be utilized as the collector surface therefor. In addition, whereas the band 50 as illustrated in FIG. 8 has been referred to as a headband, it is to be noted that the band 50 may be of a type to be worn about the neck of the user, or any portion of the anatomy wherein it is desired to provide a cooling or warming flow of air. Of course, in the event the removable air conditioning unit is utilized in combination with eyeglasses, the air current blowing directly onto the glass portion thereof substantially precludes loss of vision due to "fogging" when cold glasses are exposed to warm air, or by loss of vision by smoke, or the like, which may be blown away by the fan. In addition, it is anticipated that the open framework of the eyeglasses may be utilized in the manner as hereinbefore set forth even in the event that no glass is installed therein. The novel air conditioning unit may also be of a "snap-on" type construction for installation on substantially any normal type of eyeglasses.

It is also anticipated that the air conditioning unit of the invention may be affixed in a self-contained fashion to a "walkie-talkie" helmet, to ear and hearing protector devices, such as used by airplane controllers on the ground at airports, and the like. Thus, the novel air conditioning unit of the invention makes personal air conditioning possible.

From the foregoing it will be apparent that the present invention provides a novel air conditioning unit which may be quickly and easily installed or attached to substantially any type headwear, or other type wearing apparel, and may be readily removed therefrom when the use of the unit is no longer desired or necessary. The novel air conditioning unit comprising a housing which may be removably secured to the apparel at substantially any desired position thereon. Power supply means is operably secured to the motor and is provided with switch means for facilitating the selective operation of the motor and fan by the wearer of the apparel having the air conditioning unit installed thereon. The novel air conditioning unit is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A self-contained detachable air conditioning unit for headwear and comprising housing means having grid element means provided therein permitting air flow therethrough, power means carried by said grid element means and extending into the interior of the housing means, impeller means carried by the power means and encased within the housing means and being rotatable by the power means for pulling air into the housing through said grid element means and discharging air from the housing, power supply means operably connected with the power means for selective activation thereof, and securing means provided on the housing means and cooperating between the housing means and headwear for removably securing the self-contained air conditioning unit to the headwear without alteration of the overall configuration and function of the headwear whereby said self-contained detachable air conditioning unit may be removed from the headwear for permitting conventional unit of the headwear.

2. A self-contained detachable air conditioning unit for independent use in the cooling or warming of persons and adapted to be removably secured to a head piece and comprising power means removably secured to the head piece without alteration of the configuration of the head piece, rotor means operably connected with the power means and rotatable thereby for moving air, power supply means removably secured to the head piece and operably connected with the power means for actuation thereof, and switch means removably secured to the head piece and operably connected between the power supply means and power means for controlling the actuation of the power means.

3. A self-contained detachable air conditioning unit as set forth in claim 2 wherein the power means comprises an electric motor removably secured to the head piece.

4. A self-contained detachable air conditioning unit as set forth in claim 2 wherein the head piece is a head band surrounding the forehead of a wearer.

5. A self-contained detachable air conditioning unit as set forth in claim 2 wherein the head piece is supported by the ears and nose of the wearer, and the power means and rotor means and switch means are mounted therein for moving air directly from the rotor means to the face of the user.

6. A self-contained detachable air conditioning unit as set forth in claim 2 wherein the head piece is eyeglasses.

7. A self-contained detachable air conditioning unit as set forth in claim 6 wherein the power means comprises an electric motor removably secured to the bridge portion of the eyeglasses.

8. A self-contained detachable air conditioning unit as set forth in claim 7 wherein the electric motor is disposed exterior of the eyeglasses.

9. A self-contained air conditioning unit for use in the cooling or warming of persons and adapted to be secured to a head piece and comprising power means secured to the head piece without alteration of the configuration of the head piece, rotor means operably connected with the power means and rotatable thereby for moving air, power supply means provided on the head piece and operably connected with the power means for actuation thereof, and switch means secured to the head piece and operably connected between the power supply means and power means for controlling the actuation of the power means.

10. A self-contained air conditioning unit as set forth in claim 9 wherein the power means comprises an electric motor secured to the head piece.

11. A self-contained air conditioning unit as set forth in claim 9 wherein the head piece is a head band surrounding the forehead of a wearer.

12. A self-contained air conditioning unit as set forth in claim 9 wherein the head piece is supported by the ears and nose of the wearer, and the power means and rotor means and switch means are mounted therein for moving air directly from the rotor means to the face of the user.

13. A self-contained air conditioning unit as set forth in claim 9 wherein the head piece is eyeglasses.

14. A self-contained detachable air conditioning unit as set forth in claim 13 wherein the power means comprises an electric motor removably secured to the bridge portion of the eyeglasses.

15. A self-contained air conditioning unit as set forth in claim 14 wherein the electric motor is disposed exteriorly of the eyeglasses.

*16. The invention of claim 9, wherein said head piece has a first portion for engaging the head of the user and a second portion for defining an opening adjacent to the forehead of the user.*

*17. The invention of claim 16, wherein said power means comprises an electric motor disposed exteriorly of said head piece.*

*18. The invention of claim 17, wherein said rotor means comprises a fan connected to said electric motor and rotatable thereby for moving air through said opening and toward the forehead and face of the user.*

*19. The invention of claim 9, wherein said air conditioning unit comprises: an electric motor and fan, at least one battery and a switch, all mounted on said head piece.*

*20. The invention of claim 9, wherein said power supply means comprises solar cells disposed exterior on said head piece.*

*21. The invention of claim 9, wherein said power means is an electric motor disposed exteriorly of said head piece.*

*22. The invention of claim 9, wherein said head piece comprises a sweatband for engaging the head of the user.*

*23. A self-contained air conditioning unit for use in the cooling or warming of persons and adapted to be secured to a head band and comprising:*

*an electric motor secured to the head band without alteration of the configuration of the head band;*

*a fan operably connected with the motor and rotatable thereby for moving air;*

*a battery provided on the head band and operably connected with the motor for actuation thereof; and*

*a switch secured to the head band and operably connected between the battery and motor for controlling the actuation of the motor.*

*24. The invention of claim 23, further comprising solar cells disposed exteriorly on said head band.*

*25. The invention of claim 23, wherein said electric motor is disposed exteriorly of said head band.*

*26. The invention of claim 23, wherein said head band has a first portion for engaging the head of the user and a second portion defining at least one edge of an opening adjacent to the forehead of the user.*

*27. The invention of claim 26, wherein said fan is rotatable for moving air through said opening and toward the forehead and face of the user.*

*28. A self-contained air conditioning unit for use in the cooling or warming of persons and adapted to be secured to*

*a head piece comprising a sweatband for engaging the head of the user and comprising:*

*an electric motor secured to the head piece without alteration of the configuration of the head piece;*

*a fan operably connected with the motor and rotatable thereby for moving air;*

*a battery provided on the head piece and operably connected with the motor for actuation thereof; and*

*a switch secured to the head piece and operably connected between the battery and motor for controlling the actuation of the motor.*

*29. The invention of claim 26, further comprising solar cells disposed exteriorly of said head piece.*

*30. The invention of claim 26, wherein said electric motor is deposed exteriorly of said head piece.*

*31. The invention of claim 26, wherein said sweatband has a first portion for engaging the head of the user and a second portion defining at least one edge of an opening adjacent to the forehead of the user.*

*32. The invention of claim 31, wherein said fan is rotatable for moving air through said opening and toward the forehead and face of the user.*

* * * * *

UNITED STATES PATENT AND TRADEMARK OFFICE

CERTIFICATE OF CORRECTION

PATENT NO. : Re. 33,286

DATED : August 7, 1990

INVENTOR(S) : William A. Waters

It is certified that error appears in the above-identified patent and that said Letters Patent is hereby corrected as shown below:

Column 7, Claim 1, line 22, "unit" should read --use--.

Signed and Sealed this

Third Day of November, 1992

*Attest:*

DOUGLAS B. COMER

*Attesting Officer*

*Acting Commissioner of Patents and Trademarks*